(12) United States Patent
Hwang et al.

(10) Patent No.: US 8,161,340 B2
(45) Date of Patent: Apr. 17, 2012

(54) APPARATUS AND METHOD FOR RECORDING AND/OR REPRODUCING DATA ON AN INFORMATION STORAGE MEDIUM USING PADDING INFORMATION, AND THE INFORMATION STORAGE MEDIUM

(75) Inventors: Sung-hee Hwang, Seoul (KR); Kyung-geun Lee, Gyeonggi-do (KR); Yoon-woo Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 825 days.

(21) Appl. No.: 12/059,019

(22) Filed: Mar. 31, 2008

(65) Prior Publication Data

US 2008/0181075 A1      Jul. 31, 2008

Related U.S. Application Data

(63) Continuation of application No. 10/847,675, filed on May 18, 2004, now Pat. No. 7,533,319.

(30) Foreign Application Priority Data

May 23, 2003 (KR) ................................ 2003-33127

(51) Int. Cl.
*G06F 11/00* (2006.01)
(52) U.S. Cl. .................. 714/746; 714/769; 714/773
(58) Field of Classification Search .................. 714/746, 714/763, 765, 769, 770, 771, 773
See application file for complete search history.

(56) References Cited

U.S. PATENT DOCUMENTS

| | | | | |
|---|---|---|---|---|
| 5,155,835 A | * | 10/1992 | Belsan | 711/114 |
| 5,396,620 A | * | 3/1995 | Burghart et al. | 714/6 |
| 5,422,761 A | | 6/1995 | Anderson et al. | |
| 5,481,519 A | * | 1/1996 | Hosoya | 369/53.21 |
| 5,581,742 A | * | 12/1996 | Lin et al. | 716/4 |
| 5,613,082 A | * | 3/1997 | Brewer et al. | 711/4 |
| 5,798,995 A | | 8/1998 | Fukushima et al. | |
| 5,812,735 A | * | 9/1998 | Wada | 386/81 |
| 6,191,712 B1 | | 2/2001 | Still | |
| 6,367,049 B1 | | 4/2002 | Van Dijk et al. | |
| 6,567,364 B1 | | 5/2003 | Takahashi et al. | |
| 6,567,374 B1 | * | 5/2003 | Bohnke et al. | 370/203 |

(Continued)

FOREIGN PATENT DOCUMENTS

CN         1324075        11/2001

(Continued)

OTHER PUBLICATIONS

English Abstract for Korean Patent No. 2002-15393.

(Continued)

*Primary Examiner* — Fritz Alphonse
(74) *Attorney, Agent, or Firm* — NSIP Law

(57) ABSTRACT

An apparatus and method for recording and/or reproducing data on a disc are provided using padding information, and a corresponding information storage medium. The recording method includes recording a recording unit block in which invalid data is padded in part of the block and recording padding information indicating that the invalid data is included. According to the method, a disc drive becomes able to distinguish valid data from invalid data in an error correction block such that reliability of reproduction increases and stability of the system is improved.

2 Claims, 6 Drawing Sheets

U.S. PATENT DOCUMENTS

| | | | |
|---|---|---|---|
| 6,611,483 | B1 | 8/2003 | Park et al. |
| 6,748,485 | B1 * | 6/2004 | Yokota et al. ................ 711/112 |
| 6,917,574 | B2 | 7/2005 | Kawashima |
| 7,500,137 | B2 * | 3/2009 | Park ................................ 714/8 |

FOREIGN PATENT DOCUMENTS

| | | |
|---|---|---|
| EP | 1024490 A1 | 8/2000 |
| EP | 1067794 A1 | 1/2001 |
| EP | 1 400 973 A2 | 3/2004 |
| JP | 2001-023311 | 1/2001 |
| JP | 2001-357628 | 12/2001 |
| KR | 1998-69922 | 10/1998 |
| KR | 2001-7418 | 1/2001 |
| KR | 2001-46919 | 6/2001 |
| KR | 2002-15393 | 2/2002 |
| RU | 2092910 | 10/1997 |
| WO | WO 99/34522 A1 | 7/1999 |
| WO | WO 00/13180 A1 | 3/2000 |
| WO | WO 01/09892 | 2/2001 |

OTHER PUBLICATIONS

Office Action issued in Taiwanese Patent Application No. 93114367 on Jul. 14, 2006.

Office Action issued Nov. 20, 2006 by the Korean Intellectual Property Office re: Korean Patent Application No. 2003-33127 (3pp).

Office Action issued on May 18, 2007 by the Korean Intellectual Property Office for Korean Patent Application No. 2003-33127.

Decision on Grant issued in Russian Patent Application No. 2005136363/28(040595) on Aug. 31, 2007.

Office Action issued in Indonesian Patent Application No. W-00200503122 on Dec. 27, 2007.

Office Action issued in Korean Patent Application No. 2003-33127 on Jan. 21, 2008.

U.S. Appl. No. 10/847,675, filed May 18, 2004, Sung-hee Hwang, et al., Samsung Electronics Co., Ltd.

U.S. Appl. No. 12/058,985, filed Mar. 31, 2008, Sung-hee Hwang, et al., Samsung Electronics Co., Ltd.

U.S. Appl. No. 12/058,989, filed Mar. 31, 2008, Sung-hee Hwang, et al., Samsung Electronics Co., Ltd.

U.S. Appl. No. 12/058,995, filed Mar. 31, 2008, Sung-hee Hwang, et al., Samsung Electronics Co., Ltd.

U.S. Appl. No. 12/059,008, filed Mar. 31, 2008, Sung-hee Hwang, et al., Samsung Electronics Co., Ltd.

U.S. Appl. No. 12/059,061, filed Mar. 31, 2008, Sung-hee Hwang, et al., Samsung Electronics Co., Ltd.

U.S. Appl. No. 12/059,078, filed Mar. 31, 2008, Sung-hee Hwang, et al., Samsung Electronics Co., Ltd.

Office Action issued in related Japanese Patent Application No. 2006-532056 on May 26, 2009.

Office Action issued on Jul. 10, 2009, in related Chinese Patent Application No. 2007101268099.

Canadian Office Action issued on Sep. 1, 2009, in corresponding Canadian Application No. 2,525,967 (3 pages).

International Search Report and Written Opinion of tne International Searching Authority issued Aug. 30, 2004, in counterpart International Application No. PCT/KR2004/001219 ( 10 pp., in English).

Partial Supplementary European Search Report issued Feb. 9, 2012, in counterpart European Application No. 04734430.4.

* cited by examiner

| | 0 | 1 | : | 9 | 10 | : | 18 |
|---|---|---|---|---|---|---|---|
| | $d_{0,A}$ | $d_{216,A}$ | : | $d_{1944,A}$ | $d_{108,B}$ | : | $d_{1836,B}$ |
| | $d_{1,A}$ | $d_{217,A}$ | : | $d_{1945,A}$ | $d_{109,B}$ | : | $d_{1837,B}$ |
| | $d_{2,A}$ | : | : | : | : | : | : |
| | $d_{3,A}$ | : | : | : | : | : | : |
| | : | : | : | $d_{2047,A}$ | : | : | : |
| | : | : | : | $e_{2048,A}$ | : | : | : |
| | : | : | : | : | : | : | : |
| | : | : | : | $e_{2051,A}$ | : | : | : |
| | : | : | : | $d_{0,B}$ | : | : | : |
| | : | : | : | $d_{1,B}$ | : | : | : |
| | : | : | : | : | : | : | $d_{2047,B}$ |
| | : | : | : | : | : | : | $e_{2048,B}$ |
| | : | : | : | $d_{106,B}$ | : | : | : |
| | $d_{215,A}$ | $d_{431,A}$ | : | $d_{107,B}$ | $d_{323,B}$ | : | $e_{2051,B}$ |

← 19 columns →

216 rows with data

FIG. 6

(PRIOR ART)

APPARATUS AND METHOD FOR RECORDING AND/OR REPRODUCING DATA ON AN INFORMATION STORAGE MEDIUM USING PADDING INFORMATION, AND THE INFORMATION STORAGE MEDIUM

CROSS-REFERENCE TO RELATED APPLICATIONS

This application is a continuation application of U.S. patent application Ser. No. 10/847,675 filed on May 18, 2004, now U.S. Pat. No. 7,533,319, and claims the priority of Korean Patent Application No. 2003-33127, filed on May 23, 2003, in the Korean Intellectual Property Office, the disclosures of which are incorporated herein in their entirety by reference.

BACKGROUND OF THE INVENTION

1. Field of the Invention

The present invention relates to a method and an apparatus for recording and/or reproducing data in units of a predetermined size on an information storage medium, and the information storage medium.

2. Description of the Related Art

Recording and/or reproducing data on an information storage medium such as an HD-DVD, CD, or DVD is performed in units of a predetermined size. The units are referred to as recording unit blocks or reproducing unit blocks. An example of a recording unit block or a reproducing unit block is an error correction block for correcting errors occurring when data is recorded or reproduced.

Assuming that the size of an error correction block is 64 Kbytes, when data with a size of only 4 Kbytes, which corresponds not to the entire block but to part of the error correction block, is to be recorded, the remaining part (60 Kbytes) is filled with invalid values.

If the disc drive reads out the error correction block in order to reproduce the valid data occupying only part of the block, and performs error correction, error correction of codewords containing the meaningful 4 Kbyte data is possible, but error correction of codewords having the meaningless 60 Kbyte data is impossible and as a result it is determined that error correction is impossible in the entire error correction block. Since the disc drive cannot distinguish which part of the error correction block has valid data and which part is filled with invalid data, error correction or reproduction should be reattempted, or else the error correction block, despite the fact that it contains some valid data, is finally treated as an error block.

SUMMARY OF THE INVENTION

An aspect of the present invention provides an apparatus and method for recording and/or reproducing data, by which a disc drive is made to be able to distinguish between valid data and invalid data in an error correction block such that reliability of reproduction increases and stability of the system can be guaranteed, and a corresponding information storage medium.

According to an aspect of the present invention, there is provided a recording method including recording a recording unit block where invalid data is padded in part of the block, and recording padding information indicating that the invalid data is included.

In accordance with an aspect of the present invention, in the recording of padding information, the padding information is recorded to correspond to at least one recording unit block, to correspond to at least one reproducing unit block, or is recorded in the recording unit block.

According to an aspect of the present invention, the recording of padding information includes recording information indicating whether or not there is padded data in at least one recording unit block or reproducing unit block corresponding to the information, or recording information indicating the location of padded data in at least one recording unit block or reproducing unit block corresponding to the information, or recording information indicating the value of data padded in at least one recording unit block or reproducing unit block corresponding to the information.

According to another aspect of the present invention, there is provided a reproducing method including reading out at least one recording unit block wherein valid data is included in part of the block and invalid data is padded in a remaining part of the block; and based on the padding information, obtaining the valid data.

According to an aspect of the present invention, the recording unit block is an error correction block.

According to an aspect of the present invention, obtaining the valid data includes reading out the padding information recorded to correspond to at least one reproducing unit block, from an information storage medium, or reading out padding information recorded in the recording unit block.

According to another aspect of the present invention, obtaining the valid data includes determining from the padding information whether or not there is data padded in at least one recording unit block or reproducing unit block corresponding to the padding information, and if there is padded data, obtaining valid data excluding the padded data, or finding from the padding information the location of data padded in at least one recording unit block or reproducing unit block corresponding to the padding information, and obtaining valid data excluding the padded data, or finding from the padding information the value of data padded in at least one recording unit block or reproducing unit block corresponding to the padding information, and obtaining valid data excluding the padded data.

According to another aspect of the present invention, there is provided a recording apparatus including a pickup unit which records data on a disc; and a control unit which controls the pickup unit to record data in a recording unit block where invalid data is padded in part of the block, and to record padding information indicating that the invalid data is included in the block.

According to another aspect of the present invention, there is provided a reproducing apparatus including a pickup unit which reads out at least one recording unit block where valid data is included in part of the block and invalid data is padded in a remaining part of the block; and a control unit which obtains the valid data based on the padding information.

According to another aspect of the present invention, there is provided an information storage medium including a recording unit block where valid data is included in part of the block and invalid data is padded in a remaining part of the block; and padding information indicating that the invalid data is included.

According to an aspect of the present invention, the padding information is recorded to correspond to at least one recording unit block, to correspond to at least one reproducing unit block, or is recorded in the recording unit block.

According to an aspect of the present invention, the padding information includes information indicating whether or not there is data padded in at least one recording unit block or reproducing unit block corresponding to the padding information, or the padding information further comprises at least one of information indicating the location of the padded data and information indicating the value of the padded data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates the conventional composition of a data sector from two data frames.

DETAILED DESCRIPTION OF THE EMBODIMENTS

Figure 1:
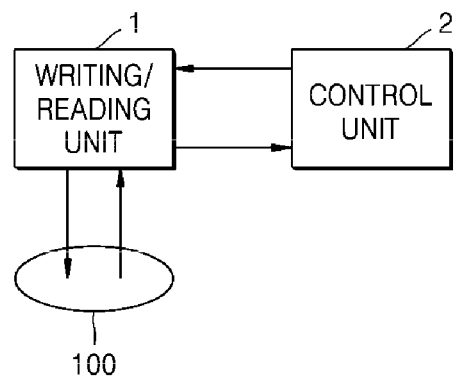
FIG. 1 is a block diagram of an apparatus according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, an apparatus according to an embodiment of the present invention is capable of recording and/or reproducing data and comprises a writing/reading unit 1 and a control unit 2. According to the control of the control unit 2, the writing/reading unit 1 records data on a disc 100, which is an information storage medium according to an embodiment of the present invention, and reads out data in order to reproduce recorded data. The control unit 2 controls the recording/reproducing unit 1 so that the writing/reading unit 1 records data in predetermined recording unit blocks, or processes data read by the writing/reading unit 1 and obtains valid data. Reproducing refers to obtaining valid data by performing error correction for the read data, and is performed in predetermined units. The units for performing reproduction are referred to as reproducing unit blocks. A reproducing unit block corresponds to at least one recording unit block.

In a data recording operation, when the control unit is recording data of a size that cannot completely fill a recording unit block on the disc 100, valid data is stored in part of the recording unit block and invalid data is padded in the remaining part to make a recording unit block of a predetermined size and then this unit block is recorded. Also, padding information indicating inclusion of invalid data is recorded on the disc 100. In the embodiment shown in FIG. 1, the padding information is recorded in a recording unit block. Padding information is not limited to an indication that invalid data is included, but refers to information enabling valid information to be distinguished from invalid information. This will be explained in more detail later.

In a data reproducing operation, the writing/reading unit 1 reads out from the disc 100 at least one recording unit block in which valid data is included in part of the block and invalid data is padded in the remaining part of the block. The control unit 2 extracts only the valid data based on the padding information contained in the recording unit blocks and reproduces the valid data.

Figure 2:
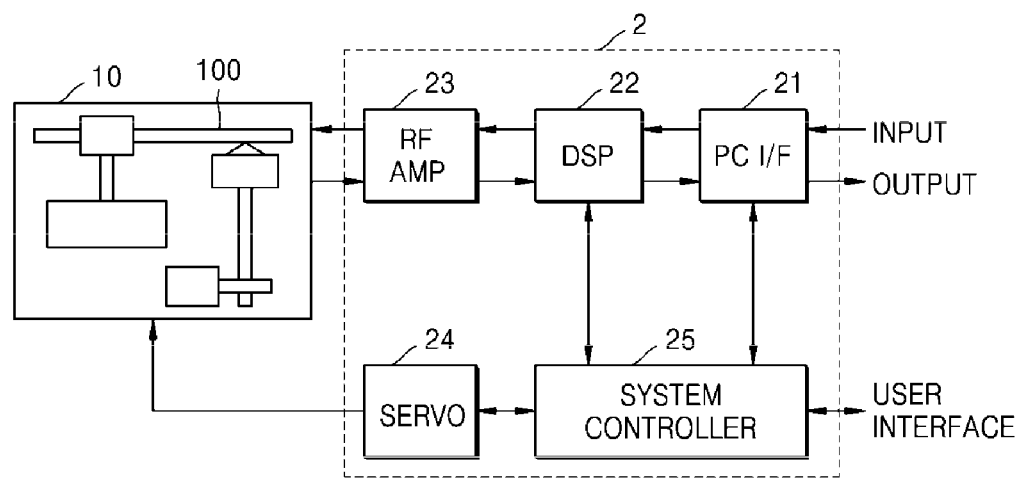
FIG. 2 is a block diagram of a disc drive to which the apparatus of FIG. 1 is applied.

FIG. 2 is a block diagram of a disc drive to which the apparatus of FIG. 1 is applied. Referring to FIG. 2, the disc drive comprises a pickup 10 as a writing/reading unit 1. The disc 100 is placed on the pickup 10. In addition, the disc drive comprises a PC I/F 21, a DSP 22, an RF AMP 23, a servo 24, and a system controller 25 as a control unit 2. The system controller 25 performs initialization required for recording data.

In the data recording operation, the PC I/F 21 receives a recording command with data to be recorded from a host. The DSP 22 adds additional data such as a parity for error correction of the data received from the PC I/F 21 and performs error correction and checking (ECC) encoding to generate an ECC block, which is an error correction block, and modulates the ECC block according to a predetermined method. Here, if data that is smaller than the size of the ECC block is to be recorded, invalid data is padded with the smaller data to make a complete ECC block. Padding information may be added before or after performing the ECC encoding. The RF AMP 23 converts the data output from the DSP 22 into an RF signal. The pickup 10 records the RF signal output from the RF AMP 23 on the disc 100. The servo 24 receives a command required for servo control from the system controller 25 and servo-controls the pickup 10.

In the data reproducing operation, the PC I/F 21 receives a reproduction command from a host (not shown). The system controller 25 performs the initialization required for reproduction. The pickup 10 emits a laser beam onto the disc 100, obtains an optical signal by receiving a reflected beam from the disc 100, and outputs the optical signal. The RF AMP 23 converts the optical signal output from the pickup 10 into an RF signal and provides modulated data obtained from the RF signal to the DSP 22 while providing a servo signal for control of the pickup obtained from the RF signal to the servo 24. The DSP 22 demodulates the modulated data, performs error correction and outputs the resulting data. In the case of an ECC block in which valid data is recorded in only part of the ECC block, only valid data is reproduced by referring to the padding information.

Meanwhile, the servo 24 performs servo control of the pickup 10, by using the servo signal received from the RF AMP 23 and a command required for servo control received from the system controller 25. The PC I/F 21 transfers the data received from the DSP 22 to the host.

FIGS. 3A through 3G are reference diagrams showing padding information according to embodiments of the present invention.

Figure 3A:
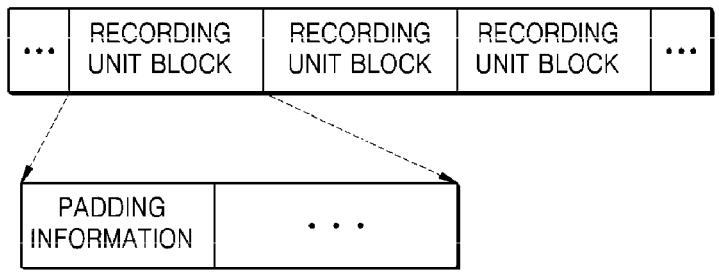
FIGS. 3A through 3G are reference diagrams showing padding information according to embodiments of the present invention.

FIG. 3A shows, padding information that is recorded in each recording unit block. Thus, padding information corresponds to each recording unit block. That is, padding information is recorded in each recording unit block. The recording unit blocks are units for recording data and usually have a predetermined size.

Figure 3B:
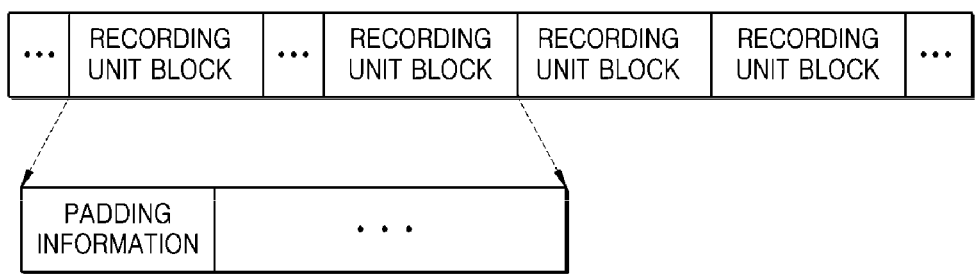

As shown in FIG. 3B, recording unit blocks are grouped into groups of predetermined number of recording unit blocks and padding information is recorded in each group. Thus, padding information corresponds to a plurality of recording unit blocks. That is, padding information is recorded in each group of recording unit blocks.

Figure 3C:
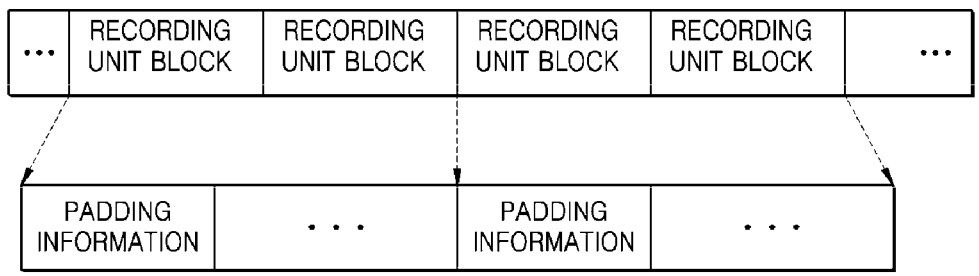

As shown in FIG. 3C, padding information is recorded in every two recording unit blocks.

Figure 3D:
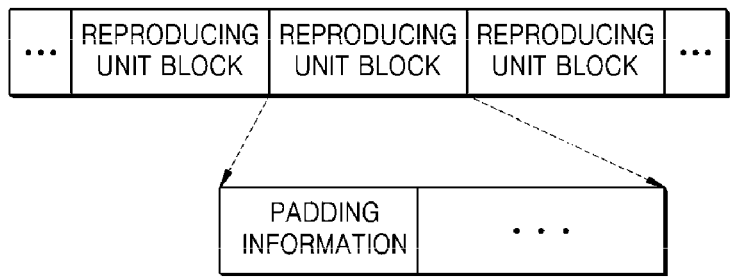

As shown in FIG. 3D, padding information is recorded in each reproducing unit block. A reproducing unit block corresponds to at least one recording unit block. Accordingly, padding information can be actually recorded in or out of a recording unit block.

Figure 3E:
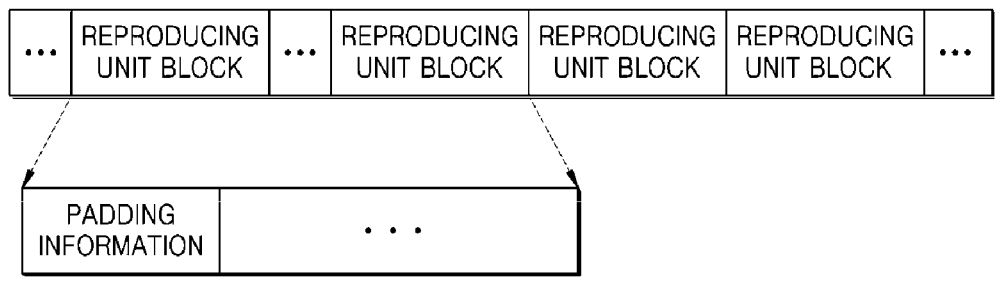

As shown in FIG. 3E, padding information reproducing unit blocks are grouped into groups of a predetermined number of the reproducing unit blocks and padding information is recorded in each of the groups of reproducing unit blocks.

Figure 3F:
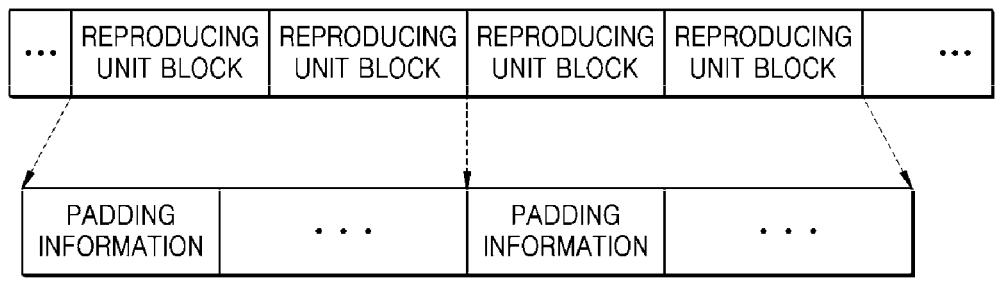

As shown in FIG. 3F, padding information is recorded in every two reproducing unit blocks.

Figure 3G:
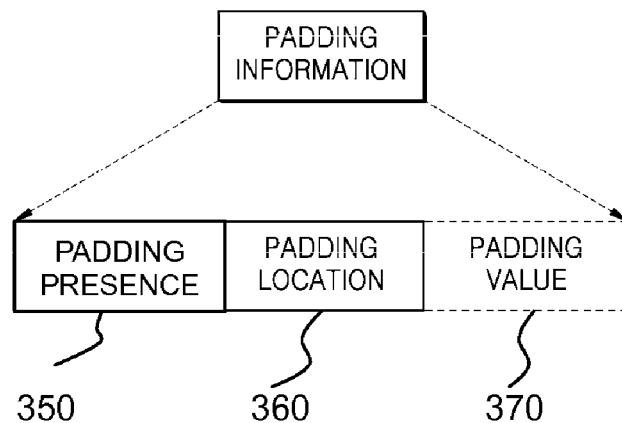

As shown in FIG. 3G padding information comprises padding presence information 350, padding location information 360, and a padding value 370. Padding presence information 350 indicates whether or not there is padded data. Padding location information 360 indicates the locations of valid data and invalid data in a recording unit block. The padding value 370 indicates a padded value. If a padded value is determined in advance, it is not necessary to record the padding value 370.

By virtue of the padding information, the disc drive of FIG. 2 is able to extract valid data from a recording unit block. Particularly, when the recording unit block is an error correction block, although it is impossible to correct an error in a codeword including only invalid data, if it is possible to correct errors in codewords containing valid data, the errors in these codewords can be corrected such that valid data is extracted and transmitted to the host. When an entire recording unit block is transmitted, a part corresponding to invalid information is transmitted, with the part containing a padded value when data is recorded, without change.

Referring to FIG. 2, based on the padding information having the structure described above, the operation of the disc drive will now be explained in more detail.

Since the amount of management information, which is generally recorded in a lead-in or lead-out area of the disc 100 to smoothly use the disc 100, is less than the size of a recording unit block (e.g., 64 Kbytes), the system controller 25 pads the remaining part with a predetermined value such as 00h so that a recording unit block of a predetermined size can be formed and transferred to the pickup 10. Also, when data is recorded according to a record command of the host, and when the size of the data to be recorded is not a multiple of a recording unit block, the system controller 25 receives the data transmitted from the host, divides the data to fit the size of the recording unit block, and then records the data. As for the leftover part of a recording unit block which is not filled with the data, the system controller 25 pads that part with a predetermined value such as 00h so that recording unit blocks of a predetermined size can be formed and transferred to the pickup 10. Accordingly, the location immediately before an area where 00h is padded in the recording unit block is the last part of an area where valid data is recorded.

When part of a recording unit block is padded with a predetermined value such as 00h, the system controller 25 records the padding information together so that the presence of the padded invalid data and the locations of valid data and invalid data in a recording unit block are indicated, and the value of invalid data (i.e., the padded value; for example, if 00h is padded, 00h, or if ffh is padded, ffh) is recorded. Thus, the location where valid data exists in a recording unit block indicates the location where valid data is recorded in the recording unit block, and the location where invalid data, for example, 00h, exists indicates where the invalid data is recorded in the recording unit block. Accordingly, the locations of valid data and invalid data in the recording unit block indicate a location up to which valid data is recorded and beyond which invalid data is recorded.

Specific examples of implementations of embodiments of the present invention will now be explained in detail.

<Recording of Padding Information>

Figure 5:
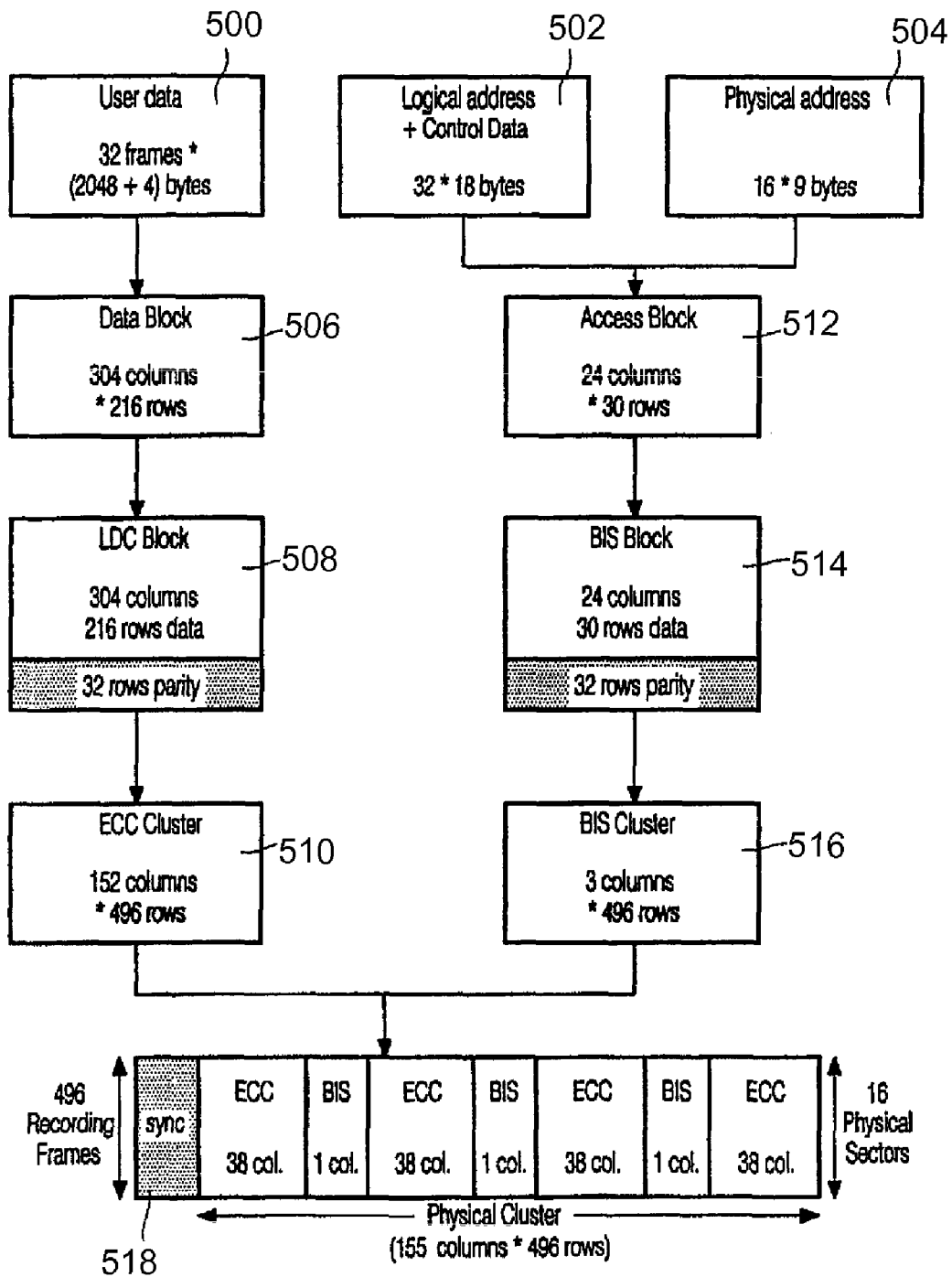
FIG. 5 is a schematic representation of a conventional overall encoding process.

"Data frame" is terminology used in U.S. Pat. No. 6,367, 049 and indicates a 2 Kbyte data block, and generally, a 2 Kbyte sector. FIG. 5 is schematic representation of a conventional encoding process. Referring to FIG. 5, the ECC format comprises an ECC cluster 510 formed of 304 long distance Reed-Solomon error correction codes, and a burst indicator subcode (BIS) cluster 516 formed of 24 burst indicator subcodes.

Figure 4:
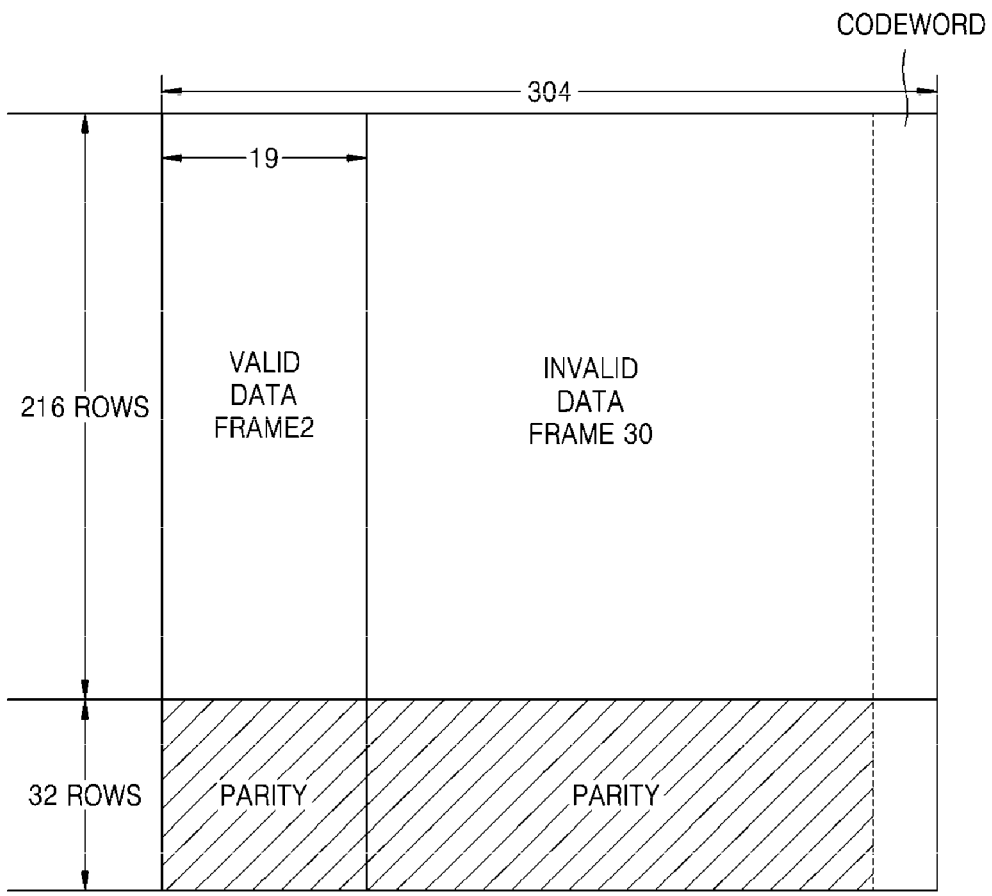
FIG. 4 is a reference diagram for explaining implementation of the present invention.

Referring to FIGS. 4 and 5, in the process of generating this BIS cluster 516, it is possible to allocate a predetermined part of the "control data" of "logical address+control data" 502 to padding presence information 350 and a padding value 370 for a sector unit which is 2 Kbytes long, in order to implement an embodiment of the present invention. For padding presence information 350 (for example, '1' indicates the presence of padded data, while '0' indicates that there is only normal data), 1 bit is needed for one sector ("Data Frame") that is 2 Kbytes long and accordingly 32 bits (4 bytes) are needed. For a padding value 370, 1 byte is needed for each sector and accordingly 32 bytes are needed. When a padding value 370 is selected among some predetermined values, it is desirable, but not required, to record information indicating the predetermined values. (For example, if there are two values, 00h and ffh, which can be padded in sector units, the padding values can be identified only by one bit indicating '0' or '1'.)

In short, the 4 byte padding presence information is recorded in "control data" of "logical address+control data" 502, the 32 byte padding value 370 is recorded in "control data" of "logical address+control data" 502, and the information indicating the padding value 370 is allocated to "control data" of "logical address+control data" 502.

When the padding value 370 is decided as one predetermined value, only padding presence information 350 need be recorded. In this case, the padding presence information 350 can be stored in "physical address" 504 (16*9 bytes) as shown in FIG. 5. Assuming, for example, the recording unit block has 16 "physical addresses" 504 corresponding to 16 physical sectors, and therefore one "physical address" 504 can be 9 bytes, then padding presence information 350 corresponding to 2 data frames can be recorded in the recording unit block.

In short, the recording unit block illustrated in FIG. 5 has 32 "data frames," including data frames 0-31, and therefore padding presence information 350 can be recorded in an N-th physical address (N=0, 1, 2, ..., 15) among 16 "physical addresses" 504.

<Padding Information Recording Operation>

In the structure for recording data in an ECC format, in order to record data on the disc 100, user data is encoded with an error correction code to make an "ECC cluster" 510, and also a "BIS cluster" 516 is generated to make a recording unit block. In doing so, information indicating whether or not each "data frame" of "user data 32 frames" 500 (64 Kbytes) in FIG. 5 is padded with a predetermined value is stored in part of "physical address" 504 (16*9 bytes) or "logical address+ control data" 502 (32*18 bytes).

A host can communicate data with a disc drive (not shown) in units of sectors, where 1 sector is 2 Kbytes. For example, if the host commands the disc drive to record 50 sectors, for the remaining 18 sectors, data corresponding to 14 sectors are padded with a predetermined value such as 00h by the disc drive itself. Since the disc drive knows that data is padded, the disc drive includes and records padding presence information 350 and a padding value 370, as padding information for each sector, in "logical address+control data" 502 (32*18 bytes) or "physical address" 504 (16*6 bytes), according to an embodiment of the present invention.

When the host makes data into recording unit blocks and then transmits them to the disc drive, the disc drive does not know whether or not data is padded. Accordingly, in this case, the host should inform the disc drive of this fact.

When the disc drive records management information on a disc in order to manage the disc under the control of the disc drive itself, although there is no record command from the host, the disc drive already knows the amount of data to be recorded and determines whether or not to pad the data. Accordingly, as described above, the disc drive can record padding presence information and a padding value together, as padding information for each sector, on the disc.

<Padding Information Reproducing Operation>

FIG. 6 illustrates the conventional composition of a data sector from two data frames. Referring to FIG. 6, when user data recorded on the data area of the disc is reproduced in response to a reproduction command from the host, or when the disc drive reproduces data without a reproduction command of the host in order to obtain disc management information recorded in the lead-in or lead-out of the disc, data is read out in units of recording/reproducing unit blocks from the disc and error correction is performed. In doing so, if data is recorded in an ECC format as illustrated in FIGS. 5 and 6, error correction is performed first on "BIS block" 514 obtained by de-interleaving an "ECC cluster" 510. The disc drive obtains padding presence information 350 and a padding value 370 for each sector (2 Kbytes) as padding information stored in "logical address+control data" 502 (32*18 bytes) or "physical address" 504 (16*9 bytes) obtained by performing error correction on the "BIS block" 514. If error correction of the "BIS block" 514 is finished, error correction is performed on an "LDC block" 508. The "data block" 506, which is obtained before ECC encoding an "LDC block" 508, is obtained in the same manner except that "19 columns" in FIG. 6 is changed into "304 columns."

Since the disc drive already knows the padding presence information 350 and the padding value 370 for each "data frame," the disc drive can distinguish a codeword containing valid information on an "LDC block" 508 from a codeword containing invalid information. At this time, even when there is a codeword containing only invalid information (i.e., a padded data frame) and it is impossible to correct errors in the codeword, if it is possible to correct errors in codewords containing valid information, these errors are corrected. Then, if the reproducing operation is performed in response to the reproduction command from the host, the corrected valid information is transmitted to the host, and if the reproducing operation is performed automatically by the disc drive itself, the information is used as is.

Meanwhile, in a disc structure where a linking area is arranged between recording unit blocks, the padding information described above can be recorded in the linking area, and when data is reproduced, can be utilized. In order to increase the reliability of data, it is preferable, but not required, that padding information read out from the linking area can also be error-corrected.

FIG. 4 is a reference diagram for explaining implementation of the present invention. Referring to FIG. 4, after a "BIS cluster" 514 is reproduced, the validity of data corresponding to each "data frame" is known, and it is known that only the first two "data frames" contain valid information. FIG. 4 shows an "LDC block" 508 to be error-corrected in this case.

If errors in the 19 codewords corresponding to the first two "data frames" in the "LDC Block" 508 can all be corrected, the error correction system transmits data corresponding to the first two "data frames", irrespective of whether or not errors in codewords corresponding to the invalid 30 data frames are corrected, and when necessary, transmits the remaining 30 data frames as padding values when data is recorded.

If the recording method suggested in the embodiment of the present invention is not applied at the time of recording data, the disc drive having the error correction system cannot know the situation shown in FIG. 4 at all. Accordingly, even though it is possible to correct errors in the 19 codewords corresponding to the two "data frames", if it is impossible to correct an error in any of the remaining codewords, the disc drive reads out data again from the disc and performs error correction or discards the block as erroneous.

Meanwhile, in a reproduction-only disc, padding information according to the present invention can be recorded when data is stored during manufacture of the disc such that data reproduction efficiency can be improved.

According to the present invention as described above, a disc drive becomes able to distinguish valid data and invalid data in an error correction block such that reliability of reproduction increases and stability of the system can be guaranteed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for recording data on an information storage medium, the method comprising:
   recording, on the information storage medium, a physical cluster comprising:
   a plurality of data frames in which valid data and/or invalid data are recorded; and
   status information indicating whether at least one of the plurality of data frames comprises invalid data.

2. A method for reproducing data from an information storage medium, the method comprising:
   reproducing, from the information storage medium, a physical cluster comprising:
   a plurality of data frames in which valid data and/or invalid data are recorded; and
   status information indicating whether at least one of the plurality of data frames comprises invalid data.

* * * * *